United States Patent Office.

F. C. A. BOCK, OF COPENHAGEN, DENMARK.

Letters Patent No. 92,004, dated June 29, 1869.

IMPROVEMENT IN THE MANUFACTURE OF STEARIC ACID

The Schedule referred to in these Letters Patent and making part of the same.

*To all whom it may concern:*

Be it known that I, F. C. A. BOCK, of Copenhagen, in the Kingdom of Denmark, have invented a new and improved Mode of Manufacturing Stearic Acid; and I do hereby declare that the following is a full, clear, and exact description of the same.

The nature of my invention consists in manufacturing stearic acid, of fatty substances, without any process of distillation.

To enable others to use my improvement, I will proceed to describe its operation.

Tallow, or any other neutral fatty substances, is heated to 110° to 125° Celsius. It is well agitated, and, at the same time, five or five and a half per cent. concentrated sulphuric acid is added, which causes an abundant development of sulphurous acid.

This compound is boiled for several hours with water, and, by degrees, three or three and a half per cent. of sulphuric acid, diluted in water, is added.

The boiling continues until a perfect decomposition has taken place, and until the fatty acids are perfectly crystallized. The glycerine is now in a watery solution as sulphate of oxide of glyceryl.

By this proceeding, I give to the fatty acids the high melting-point of 50½° Celsius, and thereby a high percentage of hard acids. I have the whole theoretical yield, both of fatty acids and of glycerine. Nothing hereof is lost, carbonized by the sulphuric acid.

By such process, a great part of the elaic acid is transformed into elaidic acid.

The decomposed, fatty, darkly-colored acids are purified or bleached to such a degree, that they may be subjected to the usual pressure without being first purified by distillation, to effect which, I let them first rest from twelve to sixteen hours. During this rest, a part of black substances is precipitated in the sulpho-glyceric water, and carried off along with it, by the opening of a cock, placed at the bottom of the vessel.

When this is done, the fatty acids are removed to another vessel, which is provided with two leaden steam-pipes. In this vessel I make the fatty acids boil, partly by open and partly by closed steam; and, during the boiling, and while continuing agitation, I add a strong solution, in acidulated water, of one or two of the following intensely-bleaching reagents:

Bichromate of potassa, permanganate of potassa, perchlorates, hypochloride of lime, hydrochloric and sulphurous acid, two or three per cent.

By doing so, I maintain the strength of the solution of the oxides used, by alternately boiling with closed and open steam, in two or three hours.

The effect of the above-described operation is the complete oxidation of the black substances, by which their specific gravity is increased so much that they will be precipitated.

After the agitation and boiling, I let the fatty acids rest again for twelve or sixteen hours, in order to facilitate the precipitation of the black substances.

The fatty acids are now transferred to another vessel, provided with open steam, and again boiled, for two or three hours, with acidulated water.

Several repeated washings, by boiling, after alternate rests, in the same or other vessels, are now sufficient to complete the elimination of all the black substances.

After this process, the fatty acids are as light as if they had been saponified with lime. Their melting-point has now risen to 52° or 53° Celsius, and they may now, with safety, be pressed in the usual way.

The stearic acid is beautifully white and hard, and the oils very light.

The fatty acids are not injured by a treatment of high degrees of temperature, and I entirely avoid the dangerous process of distillation.

The process may be performed in open lined or not lined vessels, with free steam, and the stearic acid produced is of a very superior quality, and may be manufactured at a low price.

Having thus described my invention,

What I claim, and desire to secure by Letters Patent, is—

The process of manufacturing stearic acid, employing sulphuric acid as an active agent, and avoiding the dangerous operation of distillation, by proceeding, for the elimination of the black substances, in the manner herein described.

In testimony whereof, I have signed my name to the annexed specification, in the presence of two subscribing witnesses.

F. C. A. BOCK.

Witnesses:
   THEODOR WINTHER,
   CAPPELLEN SOLLEDSEN.